(12) United States Patent
Murota

(10) Patent No.: US 11,052,503 B2
(45) Date of Patent: Jul. 6, 2021

(54) SPINDLE DEVICE

(71) Applicant: FANUC CORPORATION, Yamanashi (JP)

(72) Inventor: Masahiro Murota, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 10 days.

(21) Appl. No.: 16/516,533

(22) Filed: Jul. 19, 2019

(65) Prior Publication Data

US 2020/0023482 A1 Jan. 23, 2020

(30) Foreign Application Priority Data

Jul. 23, 2018 (JP) .............................. JP2018-137608

(51) Int. Cl.
*B23Q 11/14* (2006.01)
*B23B 23/04* (2006.01)

(52) U.S. Cl.
CPC ............ *B23Q 11/141* (2013.01); *B23B 23/04* (2013.01)

(58) Field of Classification Search
CPC ... B23Q 11/141; B23Q 11/127; B23Q 11/148; B23Q 11/005
USPC ........................................................ 384/320
See application file for complete search history.

(56) References Cited

U.S. PATENT DOCUMENTS

| | | | | |
|---|---|---|---|---|
| 3,219,855 A | * | 11/1965 | Zimmerman | ........ B23Q 11/127 310/57 |
| 3,304,051 A | * | 2/1967 | Calhoun | .................. B23Q 5/06 415/80 |
| 4,402,559 A | * | 9/1983 | Shibata | .................... F16C 37/00 384/320 |
| 2011/0280679 A1 | | 11/2011 | Morimura | |
| 2016/0076794 A1 | * | 3/2016 | Saito | .................. B23Q 11/1053 62/6 |
| 2019/0128421 A1 | * | 5/2019 | Tsai | ........................ B23Q 1/70 |

FOREIGN PATENT DOCUMENTS

| | | |
|---|---|---|
| CN | 201087935 Y | 7/2008 |
| CN | 101628342 A | 1/2010 |
| CN | 101633133 A | 1/2010 |
| CN | 101885075 A | 11/2010 |
| CN | 103174476 A | 6/2013 |
| CN | 203426456 U | 2/2014 |
| CN | 103659402 A | 3/2014 |
| CN | 204140884 U | 2/2015 |
| CN | 207563748 U | 7/2018 |
| JP | 2007245255 A | 9/2007 |
| JP | 2011240428 A | 12/2011 |

(Continued)

OTHER PUBLICATIONS

English translation of KR 1666305 B1 (Year: 2016).*

(Continued)

*Primary Examiner* — Alan Snyder
(74) *Attorney, Agent, or Firm* — Fredrikson & Byron, P.A.

(57) ABSTRACT

A spindle device includes a spindle housing, a spindle shaft rotatably supported inside the spindle housing, a spindle mount having an insertion cavity into which the spindle housing is inserted along the axial direction of the spindle shaft, and a mount cover covering the spindle mount. A temperature regulator for adjusting the temperature inside the mount cover is provided inside the mount cover.

11 Claims, 6 Drawing Sheets

(56) References Cited

FOREIGN PATENT DOCUMENTS

| | | | |
|---|---|---|---|
| JP | 2012067906 A | 4/2012 | |
| JP | 2013208665 A | 10/2013 | |
| KR | 1666305 B1 * | 10/2016 | ......... B23Q 11/0003 |

OTHER PUBLICATIONS

English Machine Translation of Decision to Grant a Patent mailed by Japan Patent Office (JPO) for Application No. JP2018-137608, dated Jun. 16, 2020, 2 pages.
Untranslated Decision to Grant a Patent mailed by Japan Patent Office (JPO) for Application No. JP2018-137608, dated Jun. 16, 2020, 3 pages.
English Machine Translation of Notification of Reasons for Refusal mailed by Japan Patent Office (JPO) for Application No. JP2018-137608, dated May 26, 2020, 3 pages.
Untranslated Notification of Reasons for Refusal mailed by Japan Patent Office (JPO) for Application No. JP2018-137608, dated May 26, 2020, 3 pages.
English Abstract and Machine Translation for Chinese Publication No. CN101885075A, published Nov. 17, 2010, 4 pgs.
English Abstract and Machine Translation for Japanese Publication No. JP2013-208665A, published Oct. 10, 2013, 8 pgs.
English Abstract for Japanese Publication No. 2011240428 A, published Dec. 1, 2011, 2 pgs.
English Abstract and Machine Translation for Japanese Publication No. JP2007-245255A, published Sep. 27, 2007, 8 pgs.
English Abstract and Machine Translation for Chinese Publication No. CN201087935Y, published Jul. 16, 2008, 14 pgs.
English Abstract and Machine Translation for Chinese Publication No. CN101628342A, published Jan. 20, 2010, 7 pgs.
English Abstract and Machine Translation for Chinese Publication No. CN101633133A, published Jan. 27, 2010, 12 pgs.
English Abstract and Machine Translation for Japanese Publication No. JP2012-067906A, published Apr. 5, 2012, 34 pgs.
English Abstract and Machine Translation for Chinese Publication No. CN103174476A, published Jun. 26, 2013, 7 pgs.
English Abstract and Machine Translation for Chinese Publication No. CN203426456U, published Feb. 12, 2014, 6 pgs.
English Abstract and Machine Translation for Chinese Publication No. CN103659402A, published Mar. 26, 2014, 7 pgs.
English Abstract and Machine Translation for Chinese Publication No. CN204140884U, published Feb. 4, 2015, 5 pgs.
English Abstract and Machine Translation for Chinese Publication No. CN207563748U, published Jul. 3, 2018, 5 pgs.

* cited by examiner

SPINDLE DEVICE

CROSS-REFERENCE TO RELATED APPLICATION

This application is based upon and claims the benefit of priority from Japanese Patent Application No. 2018-137608 filed on Jul. 23, 2018, the contents of which are incorporated herein by reference.

BACKGROUND OF THE INVENTION

Field of the Invention

The present invention relates to a spindle device used in a lathe (machine tool) that machines a workpiece using a tool.

Description of the Related Art

There are cases where a spindle housing or the like for accommodating a spindle shaft is thermally deformed due to heat generated during machining on a workpiece, and such thermal deformation causes decrease in machining accuracy. It is therefore important to take countermeasures to suppress the thermal deformation.

For example, Japanese Laid-Open Patent Publication No. 2011-240428 discloses a cooling structure for cooling a spindle and bearings by providing coolant passages both in the housing and the spindle so as to circulate a coolant from the coolant passage in the housing to the coolant passage in the spindle and thereby flow the coolant through the inside of the spindle.

SUMMARY OF THE INVENTION

However, the cooling structure disclosed in Japanese Laid-Open Patent Publication No. 2011-240428 can cool the heated bearings, but heat generated by the bearings is transferred at least partially to the housing. If the amount of heat transferred to the housing differs in different portions of the housing, the housing is liable to thermally deform due to temperature difference from one portion to another in the housing. In recent years, there are cases where machining on a workpiece should be controlled at nanometer levels. In such a case, even if the amount of thermal deformation caused during machining is very small, decrease in machining accuracy tends to emerge. Therefore, there is a strong demand for measures to suppress the decrease in machining accuracy.

It is therefore an object of the present invention to provide a spindle device which can suppress the decrease in machining accuracy.

An aspect of the present invention resides in a spindle device including: a spindle housing; a spindle shaft configured to be rotatably supported inside the spindle housing; a spindle mount having an insertion cavity into which the spindle housing is inserted along the axial direction of the spindle shaft; a mount cover configured to cover the spindle mount; and a temperature regulator provided inside the mount cover and configured to adjust the temperature inside the mount cover.

According to the present invention, it is possible to cool the interior of the mount cover by means of the temperature regulator. Therefore, the temperature difference between the components such the spindle mount covered by the mount cover, the spindle housing inserted into the insertion cavity of the spindle mount, the spindle shaft supported inside the spindle housing, and the like, as well as the local temperature differences inside each of the components, can be reduced. It is thus possible to suppress thermal deformation of the components covered by the mount cover. As a result, a decrease in machining accuracy can be suppressed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing a preferred embodiment with reference to the accompanying drawings.

Embodiment

Figure 1:
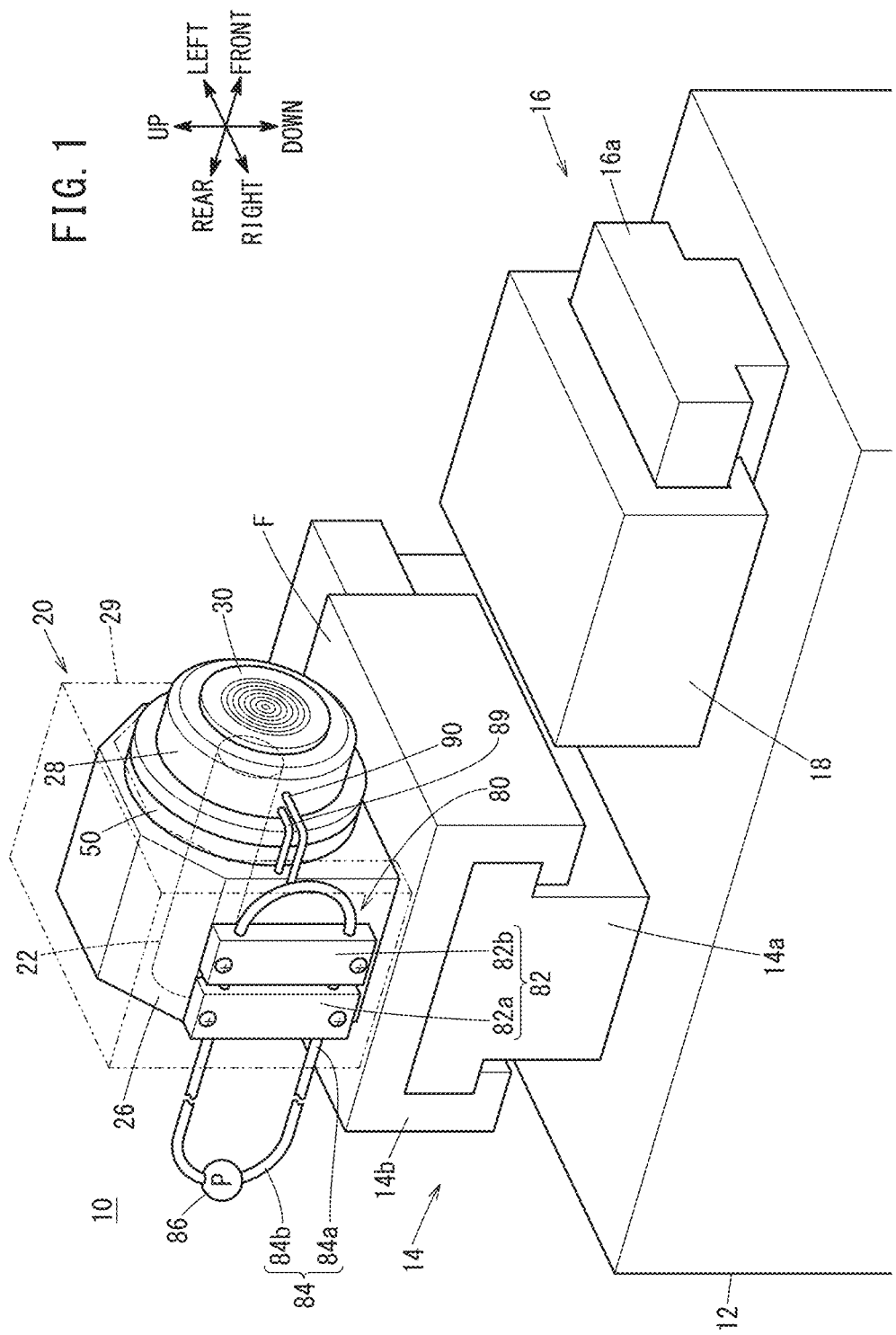
FIG. 1 is a schematic view showing a lathe according to an embodiment of the present invention.

FIG. 1 is a schematic view showing a lathe machine 10. The lathe machine 10 is used to machine a workpiece to be machined using a tool, and includes a base bed 12, a spindle support 14, a table support 16, a table 18 and a spindle device 20.

The spindle support 14 is provided on the base bed 12 to support the spindle device 20 so that it can move left and right relative to the base bed 12. Here, the direction (axial direction) in which a spindle shaft 22 of the spindle device 20 extends is referred to as the front-rear direction, the direction perpendicular to the axial direction in a plane parallel to a mounting surface F on which the spindle device 20 is mounted is referred to as the left-right direction, and the direction perpendicular to the mounting surface F and the axial direction is referred to as the up-down direction. The downward direction is the direction of gravity. Further, in the spindle device 20, one end side of the spindle shaft 22 on which a chuck portion 30 is arranged is defined as the front side, whereas the other end side of the spindle shaft 22 is defined as the rear side.

The spindle support 14 includes a first slider 14a provided along the left-right direction on the base bed 12, a spindle carriage 14b movable along the first slider 14a, and an unillustrated first drive mechanism for driving the spindle carriage 14b.

The first drive mechanism includes a motor and components such as a ball screw and others that convert the rotational motion of the motor into a linear motion. As the spindle carriage 14b is moved along the first slider 14a by the first drive mechanism, the spindle device 20 on the spindle carriage 14b is moved left and right relative to the base bed 12.

The table support 16 is arranged on the base bed 12 to movably support the table 18 in the front-rear direction with respect to the base bed 12. The table support 16 includes a second slider 16a provided along the front-rear direction on the base bed 12 and an unillustrated second drive mechanism for driving the table 18 that is movable along the second slider 16a.

The second drive mechanism includes a motor and components such as a ball screw that converts the rotational motion of the motor into a linear motion. The table 18 is moved in the front-rear direction relative to the base bed 12 through the second slider 16a by the second drive mechanism. The table 18 may be provided rotatably about a vertical axis as a rotation axis.

In the present embodiment, it is assumed that the workpiece is held by the chuck portion 30 of the spindle device 20 and the tool is held by the table 18. However, the tool may be held by the chuck portion 30 of the spindle device 20 and the workpiece may be held by the table 18.

Figure 2:
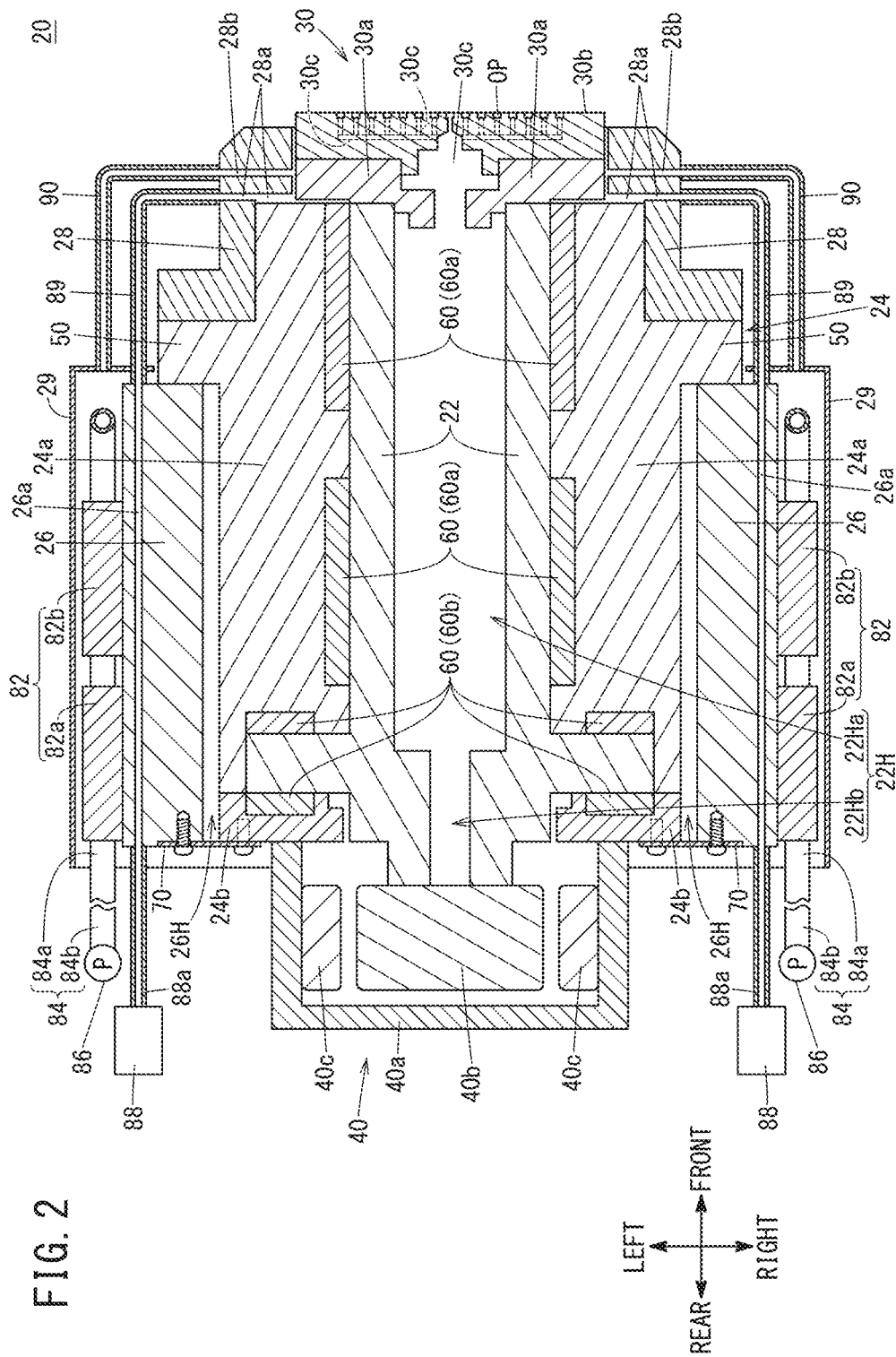
FIG. 2 is a schematic view showing a sectional view of a spindle device of FIG. 1.

FIG. 2 is a sectional view showing the spindle device 20 of FIG. 1. The spindle device 20 of the present embodiment rotatably holds a workpiece, and is used, for example, to machine the workpiece at nanometer-scale control. The spindle device 20 contains, as main components, the spindle shaft 22, a spindle housing 24, a spindle mount 26, a cover member 28 and a mount cover 29.

The spindle shaft 22 is a cylindrical member and has a cylindrical through-hole 22H penetrating in the axial direction. In the example shown in FIG. 2, the through-hole 22H has a front side through-hole 22Ha and a rear side through-hole 22Hb having a diameter smaller than that of the front side through-hole 22Ha. The chuck portion 30 is arranged on one end (front side) of the spindle shaft 22, and a motor 40 is provided on the other end (rear side).

The chuck portion 30 is a rotating member that is provided at the one end of the spindle shaft 22 so as to be rotatable in conjunction with rotation of the spindle shaft 22, on the front surface of the spindle housing 24, and in the present embodiment, the chuck portion 30 holds and releases the workpiece. Here, in FIG. 1, although the chuck portion 30 is formed in a disk shape, it may have another shape. The chuck portion 30 has a base 30a fixed on the front side of the spindle shaft 22 and a suction pad 30b detachably attached to the base 30a. The suction pad 30b has openings OP formed in a suction surface thereof. The base 30a and the suction pad 30b contain therein a communication passage 30c to establish communication between the openings OP and one end of the through-hole 22H in the spindle shaft 22. In the chuck portion 30, air outside the chuck portion 30 is drawn into the through-hole 22H from the openings OP through the communication passage 30c by an unillustrated vacuum pump, to thereby keep and hold the workpiece in close contact with the suctioning face.

The motor 40 is a drive source of the spindle shaft 22 and includes a motor case 40a attached on the rear side of the spindle housing 24, and also includes a rotor 40b and a stator 40c provided inside the motor case 40a. The spindle shaft 22 is fixed to the rotor 40b. Therefore, the spindle shaft 22 rotates together with the rotor 40b.

The spindle housing 24 includes a substantially cylindrical housing body 24a and a rear housing lid 24b. The housing body 24a is provided with an annular flange portion 50 projecting outward from the outer peripheral surface of the housing body 24a. The flange portion 50 may be formed integrally with the housing body 24a, or may be formed separately from the housing body 24a and fixed to the housing body 24a by predetermined fasteners.

The rear housing lid 24b is removably attached on the rear side of the housing body 24a so as to cover the opening on the rear of the housing body 24a. The motor case 40a of the motor 40 is fixed to the outer (rear endface) side of the rear housing lid 24b.

A substantially cylindrical space for shaft arrangement is defined by the rear housing lid 24b and the housing body 24a so as to extend therethrough in the front-rear direction. The spindle shaft 22 is arranged in the shaft arrangement space, and the spindle shaft 22 arranged in the shaft arrangement space is rotatably supported by bearings 60.

The bearings 60 include thrust bearings 60a and radial bearings 60b in this embodiment. The thrust bearings 60a are arranged on the left and right sides of the spindle shaft 22. The radial bearings 60b are provided on the front and rear sides of a rear portion of the spindle shaft 22 that is located at the rear of the thrust bearings 60a. The bearing 60 may be a hydrostatic bearing or a rolling bearing. In the case where the machining on the workpiece should be controlled on a nanometer-scale as mentioned above, use of a hydrostatic bearing is preferable.

The spindle mount 26 is placed on the mounting surface F (FIG. 1) of the spindle carriage 14b. The spindle mount 26 has an insertion cavity 26H into which the spindle housing 24 is inserted along the axial direction of the spindle shaft 22. The front side of the spindle housing 24 inserted in the insertion cavity 26H is fixed to the front side of the spindle mount 26 by the flange portion 50 provided on the housing body 24a, and the rear side of the spindle housing 24 is supported by a support member 70 provided on the rear side of the spindle mount 26.

Specifically, the flange portion 50 is detachably fixed to the front side (one end that is closer to one opening of the insertion cavity 26H) of the spindle mount 26 by rod-shaped fasteners such as bolts. On the other hand, the support member 70 supports the spindle housing 24 by using, as a base, the rear side (the other end that is closer to the other opening of the insertion cavity 26H) of the spindle mount 26. That is, the spindle housing 24 is supported on the spindle mount 26 at two ends, i.e., at front and rear of the spindle housing 24.

The cover member 28 is provided to cover the front-side surface of the flange portion 50, the outer peripheral surface of the housing body 24a extending forward from the flange surface and part of the outer peripheral surface of the chuck portion 30. Although the cover member 28 covers part of the outer peripheral surface of the chuck portion 30, it may be arranged so as to cover either the whole of the outer peripheral surface or at least a part of the outer peripheral surface of the chuck portion 30.

The cover member 28 has, formed therein, a gas flow passage 28a for flowing a seal gas in order to seal a portion to be sealed (also referred to as a sealed portion). The sealed portion is a gap between the chuck portion 30 and the cover member 28 and a gap between the chuck portion 30 and the housing body 24a. The gas may be compressed to a predetermined pressure. Specific examples of the gas include air and others. By supplying the seal gas to the sealed portion, it is possible to prevent chips generated during machining of the workpiece, coolant used at the time of machining, etc., from entering the interior (shaft arrangement space) of the spindle housing 24 through the gaps. The seal gas flowing into the sealed portion is discharged from the front side of the spindle device 20 and other parts to the outside.

Further, unillustrated coolant flow passages for flowing the coolant are formed in the cover member 28, so that the coolant flowing through the coolant flow passage can adjust the temperature of the cover member 28. The coolant includes, for example, water, compressed air or the like.

As shown in FIGS. 1 and 2, the mount cover 29 is a cover member that covers the spindle mount 26. The mount cover 29 is fixed to the spindle carriage 14b so as to cover substantially the whole part of the spindle mount 26 (see FIG. 1). Part of the front side of the spindle housing 24 inserted in the insertion cavity 26H of the spindle mount 26 is exposed to the outside from the mount cover 29.

Inside the mount cover 29, a pair of temperature regulators 80 (see FIG. 1) for adjusting the temperature inside the mount cover 29 are provided on both the left and right outer surfaces of the outer peripheral surface of the spindle mount 26. Each temperature regulator 80 has a radiator plate 82 fixed to the outer surface of the spindle mount 26.

In the present embodiment, the radiator plate 82 has a first radiator piece 82a and a second radiator piece 82b arranged so as to be separated by a space (interval) from the first radiator piece 82a. The second radiator piece 82b is disposed in front of the first radiator piece 82a. The space between the first radiator piece 82a and the second radiator piece 82b extends in a direction intersecting the axial direction of the spindle shaft 22. In the example shown in FIG. 1, the direction of extension of the space is substantially orthogonal to the axial direction of the spindle shaft 22.

A tube (pipe) 84 is attached to the radiator plate 82. The tube 84 is used for circulating a coolant. The coolant is a liquid such as water in the present embodiment. However, it may be a gas. The tube 84 penetrates through the mount cover 29, and has a covered tube part 84a disposed inside the mount cover 29 and an uncovered tube part 84b disposed outside the mount cover 29.

The covered tube part 84a is fixed to the radiator plate 82 by a predetermined fastener. A circulation pump 86 is provided in the uncovered tube part 84b. In the example shown in FIGS. 1 and 2, the tube 84 on the left side and the tube 84 on the right side in the spindle mount 26 are not connected to each other, so that separate circulation paths are formed. But, the left tube 84 and the right tube 84 may be connected together to thereby form a single circulation path.

The coolant is circulated inside of the tube 84 (covered tube part 84a and uncovered tube part 84b) by the circulation pump 86, so that at least the coolant cools the spindle mount 26 covered by the mount cover 29. On each of the left and right sides of the spindle mount 26, a cooling passage 26a (see FIG. 2) for cooling the seal gas is formed.

The cooling passage 26a has an inlet to which a hose 88a from a compressor 88 (see FIG. 2) that is arranged outside the mount cover 29 is attached. Further, the cooling passage 26a has an outlet to which a flow passage 28a formed in the cover member 28 is connected by way of a communication tube 89 (see FIG. 2). Therefore, the seal gas having flowed through the cooling passage 26a sequentially passes through the communication tube 89 and the flow passage 28a, and is then supplied to the gas supply destination, i.e., the gap between the chuck portion 30 and the cover member 28.

Further, a gas supply tube 90 for supplying the seal gas to the interior of the mount cover 29 is connected to the mount cover 29. The gas supply tube 90 has an inlet to which a flow passage 28b (see FIG. 2) formed in the cover member 28 is connected.

The flow passage 28b is a flow passage for supplying part of the seal gas supplied to the gap between the chuck portion 30 and the cover member 28, to the gas supply tube 90. In the present embodiment, one end of the flow passage 28b is open to the gap between the chuck portion 30 and the cover member 28, and the other end of the flow passage 28b is open on the outer peripheral surface of the cover member 28. Further, in order to discharge the seal gas supplied to the sealed portion, to the outside of the spindle housing 24, the gas supply tube 90 may be connected to an unillustrated discharge path formed in the spindle housing 24.

Referring next to FIGS. 1 and 2, the flow of the seal gas will be explained. In the spindle device 20 of this embodiment, the seal gas is ejected from the compressor 88. As is ejected from the compressor 88, the seal gas flows into the cooling passage 26a formed in the spindle mount 26 via the hose 88a from the compressor 88 and flows through the cooling passage 26a.

The seal gas that has flowed out of the cooling passage 26a flows into the flow passage 28a formed in the cover member 28 through the communication tube 89, and flows through the gap between the chuck portion 30 and the cover member 28 after passing through the flow passage 28a. A part of the seal gas flowing into the gap is discharged from the front side of the spindle device 20 to the outside while another part of the seal gas flows into the flow passage 28b formed in the cover member 28.

The seal gas that has flowed into the flow passage 28b further flows into the gas supply tube 90 via the flow passage 28b and then flows into the interior of the mount cover 29 after passing through the gas supply tube 90. The seal gas that has entered the interior of the mount cover 29 convects inside the mount cover 29, and a part thereof is discharged from the discharge port of the mount cover 29 to the outside. The discharge port may be a gap formed between the mount cover 29 and the spindle housing 24, or may be a through hole provided in the mount cover 29.

MODIFICATIONS

Though the above embodiment has been described as one example of the present invention, the technical scope of the present invention should not be limited to the above embodiment. It goes without saying that various modifications and improvements can be added to the above embodiment. It is also apparent from the scope of the claims that embodiments added with such modifications and improvements should be incorporated in the technical scope of the invention. Examples in which the above embodiment is modified or improved will be described below.

Modification 1

Figure 3:
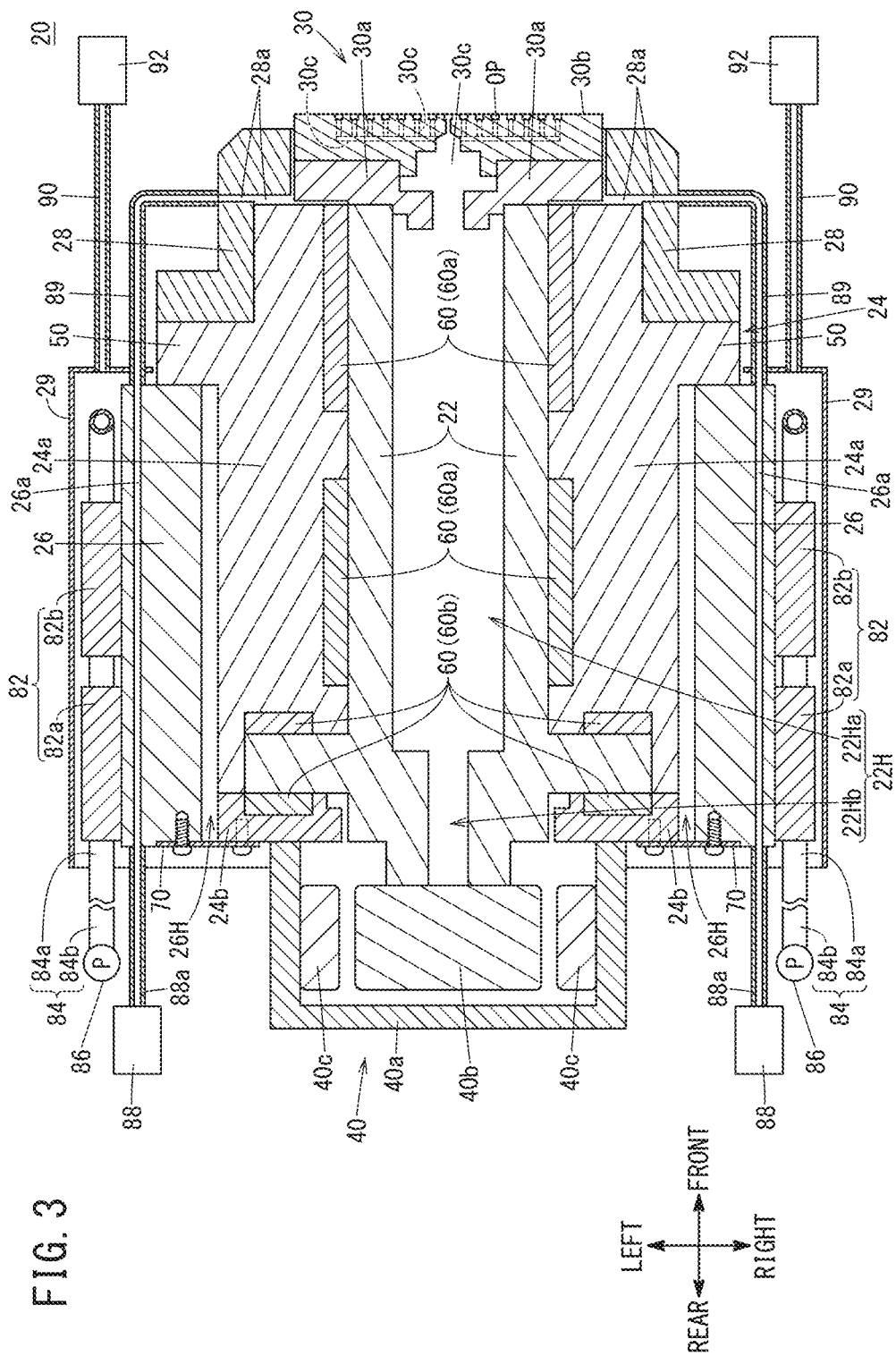
FIG. 3 is a schematic view showing a sectional view of a spindle device of Modification 1.

FIG. 3 is a schematic view showing a spindle device 20 of Modification 1. In FIG. 3, the same components as those described in the above embodiment are denoted with the same reference numerals, and the configuration of the above embodiment already described is omitted as appropriate.

In the spindle device 20 according to Modification 1, the gas supply tube 90 is connected to a dedicated compressor 92 for supplying a compressed gas into the interior of the mount cover 29, and the compressed gas flowing from the compressor 92 into the gas supply tube 90 is supplied to the interior of the mount cover 29. In this way, the compressed gas supplied into the interior of the mount cover 29 does not need to be the seal gas, unlike the above embodiment.

Modification 2

Figure 4:
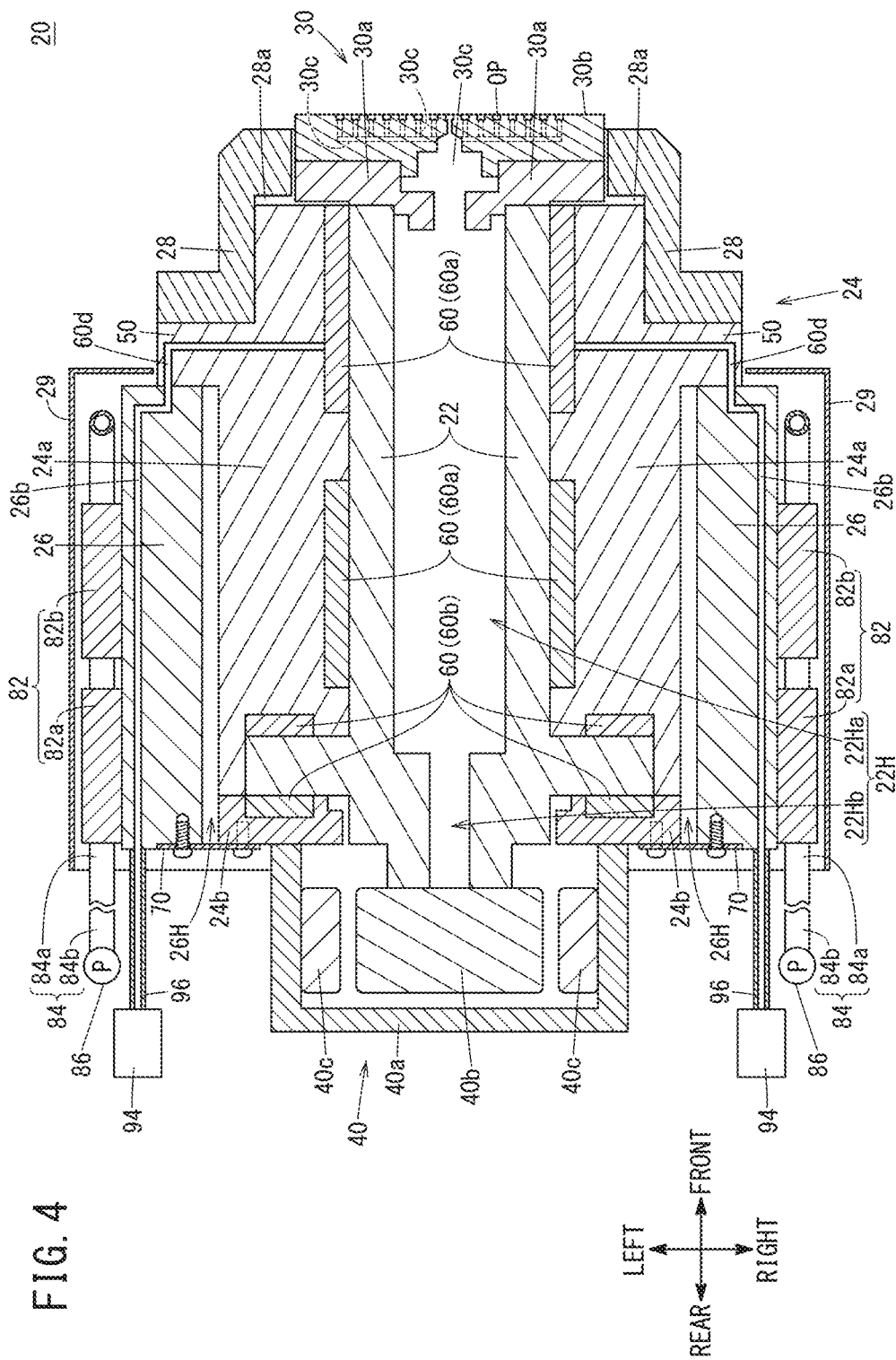
FIG. 4 is a schematic view showing a sectional view of a spindle device of Modification 2.

FIG. 4 is a schematic view showing a spindle device 20 of Modification 2. In FIG. 4, the same components as those described in the above embodiment are denoted with the same reference numerals, and the configuration of the above embodiment already described is omitted as appropriate.

In the spindle device 20 of Modification 2, the bearing 60 is a hydrostatic bearing, and the spindle housing 24 (housing body 24a) has passages 60d formed therein for supplying a lubricant gas to the bearing 60. The lubricant gas may be, for example, a compressed gas in which a gas such as air is compressed to a predetermined pressure, and may be compressed under a pressure higher than that of the seal gas. A supply unit 94 for supplying the lubricant gas is connected to the inlet of the cooling passage 26b formed in the spindle mount 26 via a communication channel 96, and the outlet of the cooling passage 26b is connected to the passage 60d.

Here, in the housing body 24a of FIG. 4, the flow path which connects the radial bearing 60b and the cooling passage 26b is omitted for convenience sake.

In the thus configured spindle device 20 of Modification 2, the lubricant gas supplied from the supply unit 94 flows into the cooling passage 26b through the communication channel 96, and flows through the cooling passage 26b. Then, the lubricant gas flowing out from the cooling passage 26b is supplied to the bearing 60 via the passage 60d. The lubricant gas supplied to the bearing 60 flows from the bearing 60 to the shaft arrangement space and acts as a support for the spindle shaft 22. The lubricant gas that has flowed into the shaft arrangement space is discharged to the outside through an unillustrated discharge path formed in the spindle housing 24.

In this way, the cooling passage 26b for cooling the lubricant gas is formed in the spindle mount 26, so that the lubricant gas that has flowed through the cooling passage 26b may be supplied to the gas supply destination, i.e., the bearing 60.

Modification 3

Figure 5:
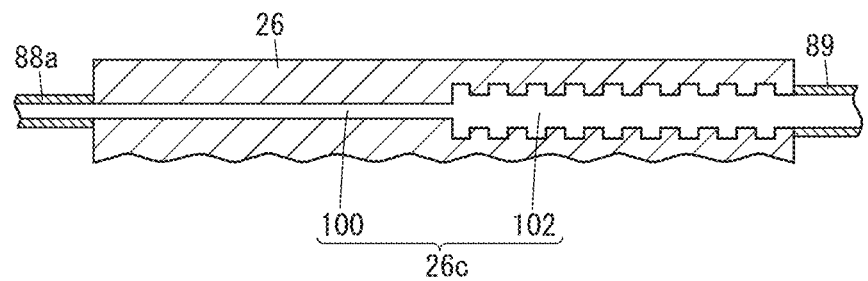
FIG. 5 is an enlarged view of a part of a spindle device of Modification 3.

FIG. 5 is an enlarged view of a part of the spindle device 20 of Modification 3. In FIG. 5, the same components as those described in the above-described embodiment are denoted with the same reference numerals, and the configuration of the above embodiment already described is omitted as appropriate.

In the spindle device 20 of Modification 3, a cooling passage 26c is provided instead of the cooling passage 26a of the above embodiment. The cooling passage 26c has a first conduit section 100 in communication with the inlet, and a second conduit section 102 in communication with the first conduit section 100 and the outlet. The second conduit section 102 is formed wider than the first conduit section 100. That is, the cross-section perpendicular to the flow direction in which the gas flows through the cooling passage 26c is greater in the second conduit section 102 than in the first conduit section 100.

As described above, in the cooling passage 26c, an inner space on the outlet side (downstream side) is larger than an inner space on the inlet side (upstream side). Thus, when the compressed gas has flowed from the first conduit section 100 into the second conduit section 102, the gas adiabatically expands, so that the temperature of the compressed gas tends to fall. Therefore, the gas flowing through the cooling passage 26c can be made cooler than in the above embodiment.

Further, in Modification 3, the wall surface defining the second conduit section 102 is formed into a corrugated shape (a concave-convex shape). Therefore, since the surface area of the wall surface is larger as compared to the case where there is no corrugated shape, the gas flowing through the cooling passage 26c can be further cooled. However, the formation of the corrugated shape on the wall surface defining the second conduit section 102 is not essential. Incidentally, the wall surface defining the second conduit section 102 means the wall surface of the partition wall of the spindle mount 26 that forms the second conduit section 102.

In the example shown in FIG. 5, the second conduit section 102 extends substantially straight along the axial direction of the spindle shaft 22, but may have a bent or curved portion which is, for example, a meandering path. When the second conduit section 102 has a bent portion, the distance from the first conduit section 100 to the outlet becomes longer than when the second conduit section 102 extends substantially straight, so that the gas flowing through the cooling passage 26c can be further cooled.

In the example shown in FIG. 5, the cross-section of the second conduit section 102 perpendicular to the flow direction in which the gas flows through the cooling passage 26c is substantially constant, but this may be varied. For example, the cross-section of the second conduit section 102 in the direction perpendicular to the flow direction of the gas flowing through the cooling passage 26c may gradually increase from the first conduit section 100 toward the outlet port.

Modification 4

Although the shapes of the first radiator piece 82a and the second radiator piece 82b are the same in the above embodiment, they may be different. Further, although the first radiator piece 82a and the second radiator piece 82b have the same size in the embodiment, but may have a different size from each other.

Since heat transmitted from the interior of the spindle housing 24 to the spindle housing 24 is liable to be transmitted through the flange portion 50 fixed to the spindle housing 24, the spindle mount 26 is prone to such a temperature gradient in which the temperature on the front side tends to be higher than that on the rear side. Therefore, it is preferable that the surface area of the second radiator piece 82b be greater than that of the first radiator piece 82a. With this configuration, even if there is a temperature gradient in the front-rear direction of the spindle mount 26, it is possible to lower the temperature gradient that occurs in the front-rear direction.

In addition, in order to easily reduce the warp of the radiator plate 82 caused by the temperature difference between the spindle mount 26 and the radiator plate 82, it is preferable that the first radiator piece 82a and the second radiator piece 82b are each fixed to the spindle mount 26 at one place.

Modification 5

Figure 6:
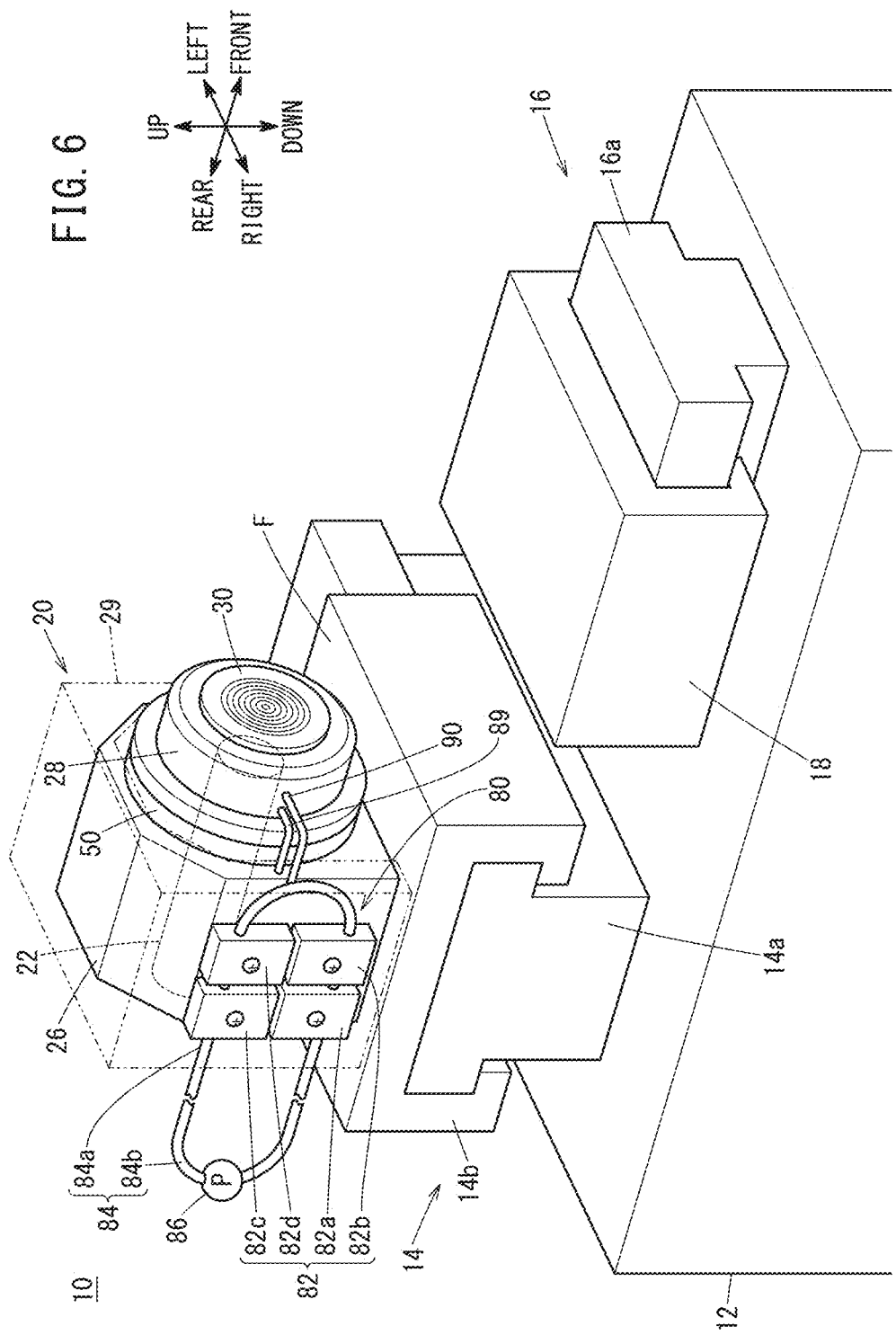
FIG. 6 is a view showing a spindle device of Modification 5 from the same viewpoint as FIG. 1.

In the above embodiment, the radiator plate 82 is divided into two pieces, the first radiator piece 82a and the second radiator piece 82b. However, the radiator plate 82 may be divided into four of first to fourth radiator pieces 82a to 82d, as illustrated in FIG. 6. Further, although not shown, the radiator plate 82 may be divided into three or five or more, or may be integrated into one.

Modification 6

The above-mentioned embodiment and the above-described Modifications may be combined arbitrarily as long as no technical inconsistency occurs.

Technical Ideas

Technical ideas that can be grasped from the above-described embodiment and Modifications will be described below.

The spindle device (20) includes a spindle housing (24), a spindle shaft (22) configured to be rotatably supported inside the spindle housing (24), and a spindle mount (26) having an insertion cavity (26H) into which the spindle housing (24) is inserted along the axial direction of the spindle shaft (22).

The spindle device (20) further includes a mount cover (29) configured to cover the spindle mount (26), and a temperature regulator (80) is provided inside the mount cover (29) and configured to adjust the temperature inside the mount cover (29).

In this spindle device (20), the interior of the mount cover (29) can be cooled by the temperature regulator (80). Therefore, heat generation in the spindle mount (26) covered by the mount cover (29), in the spindle housing (24) inserted into the insertion cavity (26H) of the spindle mount (26), or in the spindle shaft (22) supported inside the spindle housing (24) can be reduced. Therefore, it is possible to prevent a decrease in machining accuracy caused by thermal deformation of the spindle mount (26), the spindle housing (24) and the spindle shaft (22).

The temperature regulator (80) may include a radiator plate (82) fixed to the outer peripheral surface of the spindle mount (26), and a tube (84) through which a coolant flows may be attached to the radiator plate (82).

This configuration makes it possible not only to dissipate heat generated in the spindle mount (26) by the radiator plate (82) but also to cool the interior of the mount cover (29) by the coolant. Therefore, generation of heat from the spindle mount (26), the spindle housing (24) or the spindle shaft (22) can be more easily reduced.

A gas supply tube (90) through which a compressed gas is supplied to the interior of the mount cover (29) may be connected to the mount cover (29).

With this configuration, the compressed gas can generate convection flow inside the mount cover (29). Accordingly, it is possible to cool the whole of the interior of the mount cover (29) so as to reduce the temperature difference inside the mount cover (29) compared to the case when the compressed gas is not supplied into the interior of the mount cover (29).

Part of a seal gas supplied to a gap between a rotating member (30) rotatably arranged on the surface of one end side of the spindle shaft (22) in the spindle housing (24) and a cover member (28) covering the outer peripheral surface of the rotating member (30) may flow into the gas supply tube (90).

This configuration makes it possible to use the seal gas for sealing the gap between the rotating member (30) and the cover member (28) as the compressed gas for generating convection flow in the interior of the mount cover (29). Accordingly, compared to the case where a compressed gas for convection of the interior of the mount cover (29) is used separately from the seal gas, the amount of consumed gas can be greatly suppressed. Therefore, the interior of the mount cover (29) can be cooled efficiently.

A cooling passage (26a to 26c) configured to cool the gas supplied thereto may be formed in the spindle mount (26), and the gas that has flowed through the cooling passage (26a to 26c) may be supplied to a gas supply destination.

This configuration enables the temperature regulator (80) to cool the gas flowing through the cooling passage (26a to 26c) of the spindle mount (26) covered by the mount cover (29), so that the cooled gas can be supplied to the gas supply destination. Accordingly, it is possible to reduce generation of heat in the path from the cooling passage (26a to 26c) to the gas supply destination and generation of heat in the gas supply destination. It is thus possible to further suppress the decrease in machining accuracy due to thermal deformation.

The cooling passage (26c) may include a first conduit section (100) configured to communicate with the inlet for the gas, and a second conduit section (102) formed wider than the first conduit section (100) and configured to communicate between the first conduit section (100) and the outlet for the gas.

This configuration enables the compressed gas flowing from the first conduit section (100) into the second conduit section (102) to adiabatically expand, so that the temperature of the compressed gas becomes easy to fall. Therefore, it is possible to cool the gas flowing through the cooling passage (26c) further more.

The gas supply destination may be a gap between a rotating member (30) rotatably arranged on the surface of one end side of the spindle shaft (22) in the spindle housing (24) and a cover member (28) covering the outer peripheral surface of the rotating member (30). This configuration makes it possible to supply the seal gas for sealing the gap, in a cooled condition.

The gas supply destination may be a bearing that rotatably supports the spindle shaft (22). This configuration makes it possible to supply the gas for hydrostatic bearing, in a cooled condition.

The radiator plate (82) may include a first radiator piece (82a) and a second radiator piece (82b) arranged so as to be separated by a space from the first radiator piece (82a), and the second radiator piece (82b) may be arranged closer to the one end side of the spindle shaft (22) where a rotating member (30) rotatable in conjunction with the spindle shaft (22) is arranged, than the first radiator piece (82a) is.

This configuration makes it easy to alleviate the temperature gradient from one end to the other end of the spindle shaft (22) in the spindle mount (26) even if the temperature gradient arises between two ends.

The space between the first radiator piece (82a) and the second radiator piece (82b) may be configured to extend in a direction intersecting the axial direction of the spindle shaft (22).

This configuration makes it easier to alleviate the temperature gradient from one end to the other end of the spindle shaft (22) in the spindle mount (26), compared to the case where the space between the first radiator piece (82a) and the second radiator piece (82b) extends in parallel to the axial direction of the spindle shaft (22).

The surface area of the second radiator piece (82b) may be configured to be larger than that of the first radiator piece (82a).

This configuration makes it easier to alleviate the temperature gradient from one end to the other end of the spindle shaft (22) in the spindle mount (26).

Each of the first radiator piece (82a) and the second radiator piece (82b) may be fixed at one place to the spindle mount (26).

This makes it easy to reduce the warp of the radiator plate (82) due to the temperature difference between the spindle mount (26) and the radiator plate (82).

What is claimed is:

1. A spindle device comprising:
a spindle housing;
a spindle shaft configured to be rotatably supported inside the spindle housing;
a spindle mount having an insertion cavity into which the spindle housing is inserted along an axial direction of the spindle shaft;
a mount cover configured to cover the spindle mount; and
a temperature regulator provided inside the mount cover and configured to adjust a temperature inside the mount cover,
wherein
part of a seal gas supplied to a gap between a rotating member rotatably arranged on one end side of the spindle shaft in the spindle housing and a cover member covering an outer peripheral surface of the rotating member flows into a gas supply tube;
the gas supply tube is connected to the mount cover;
the temperature regulator includes a radiator plate fixed to an outer peripheral surface of the spindle mount;
the radiator plate includes a first radiator piece and a second radiator piece arranged so as to be separated by a space from the first radiator piece;
the second radiator piece is arranged closer to one end side of the spindle shaft where a rotating member rotatable in conjunction with the spindle shaft is arranged, than the first radiator piece is; and
a tube through which a coolant flows is attached to the radiator plate.

2. The spindle device according to claim 1, wherein the space is configured to extend in a direction intersecting an axial direction of the spindle shaft.

3. The spindle device according to claim 1, wherein a surface area of the second radiator piece is configured to be larger than that of the first radiator piece.

4. The spindle device according to claim 1, wherein each of the first radiator piece and the second radiator piece is fixed at one place to the spindle mount.

5. A spindle device comprising:
a spindle housing;
a spindle shaft configured to be rotatably supported inside the spindle housing;
a spindle mount having an insertion cavity into which the spindle housing is inserted along an axial direction of the spindle shaft;
a mount cover configured to cover the spindle mount; and
a temperature regulator provided inside the mount cover and configured to adjust a temperature inside the mount cover,
wherein a cooling passage configured to cool a gas supplied thereto is formed in the spindle mount, and the gas that has flowed through the cooling passage is supplied to a gas supply destination, wherein:
the temperature regulator includes a radiator plate fixed to an outer peripheral surface of the spindle mount; and
a tube through which a coolant flows is attached to the radiator plate, wherein:
the radiator plate includes a first radiator piece and a second radiator piece arranged so as to be separated by a space from the first radiator piece; and
the second radiator piece is arranged closer to one end side of the spindle shaft where a rotating member rotatable in conjunction with the spindle shaft is arranged, than the first radiator piece is.

6. The spindle device according to claim 5, wherein the space is configured to extend in a direction intersecting an axial direction of the spindle shaft.

7. The spindle device according to claim 5, wherein a surface area of the second radiator piece is configured to be larger than that of the first radiator piece.

8. The spindle device according to claim 5, wherein each of the first radiator piece and the second radiator piece is fixed at one place to the spindle mount.

9. The spindle device according to claim 5, wherein the gas supply destination is a gap between a rotating member rotatably arranged on one end side of the spindle shaft in the spindle housing and a cover member covering an outer peripheral surface of the rotating member.

10. The spindle device according to claim 5, wherein the gas supply destination is a bearing that rotatably supports the spindle shaft.

11. A spindle device comprising:
a spindle housing;
a spindle shaft configured to be rotatably supported inside the spindle housing;
a spindle mount having an insertion cavity into which the spindle housing is inserted along an axial direction of the spindle shaft;
a mount cover configured to cover the spindle mount; and
a temperature regulator provided inside the mount cover and configured to adjust a temperature inside the mount cover,
wherein a cooling passage configured to cool a gas supplied thereto is formed in the spindle mount, and the gas that has flowed through the cooling passage is supplied to a gas supply destination, wherein the cooling gas passage includes a first conduit section configured to communicate with an inlet for the gas, and a second conduit section formed wider than the first conduit section and configured to communicate between the first conduit section and an outlet for the gas.

* * * * *